United States Patent
Vendrow

(10) Patent No.: US 12,475,304 B2
(45) Date of Patent: Nov. 18, 2025

(54) SUMMARIZING MEETING CONTENT WITH ACCURACY CONTROL

(71) Applicant: RingCentral, Inc., Belmont, CA (US)

(72) Inventor: Vlad Vendrow, Reno, NV (US)

(73) Assignee: RingCentral, Inc., Belmont, CA (US)

( * ) Notice: Subject to any disclaimer, the term of this patent is extended or adjusted under 35 U.S.C. 154(b) by 520 days.

(21) Appl. No.: 17/698,963

(22) Filed: Mar. 18, 2022

(65) Prior Publication Data

US 2023/0297765 A1  Sep. 21, 2023

(51) Int. Cl.

| | | |
|---|---|---|
| *G06F 40/30* | (2020.01) | |
| *G06F 40/166* | (2020.01) | |
| *G06Q 10/1093* | (2023.01) | |
| *G10L 15/18* | (2013.01) | |
| *G10L 15/22* | (2006.01) | |
| *G10L 15/30* | (2013.01) | |
| *G06F 40/279* | (2020.01) | |
| *G06F 40/284* | (2020.01) | |
| *G06F 40/289* | (2020.01) | |
| *G06F 40/295* | (2020.01) | |
| *G10L 15/08* | (2006.01) | |
| *G10L 15/16* | (2006.01) | |
| *H04L 12/18* | (2006.01) | |

(52) U.S. Cl.
CPC ............ *G06F 40/166* (2020.01); *G06F 40/30* (2020.01); *G06Q 10/1095* (2013.01); *G10L 15/1815* (2013.01); *G10L 15/22* (2013.01); *G10L 15/30* (2013.01); *G06F 40/279* (2020.01); *G06F 40/284* (2020.01); *G06F 40/289* (2020.01); *G06F 40/295* (2020.01); *G10L 2015/088* (2013.01); *G10L 15/16* (2013.01); *G10L 15/1822* (2013.01); *H04L 12/1813* (2013.01)

(58) Field of Classification Search
CPC ...... G06F 40/20; G06F 40/279; G06F 40/284; G06F 40/289; G06F 40/295; G06F 40/30; G06F 40/35; G10L 15/18; G10L 15/1815; G10L 15/1822; G10L 15/26; G10L 15/30; G10L 15/22; G10L 2015/221
See application file for complete search history.

(56) References Cited

U.S. PATENT DOCUMENTS

| | | | |
|---|---|---|---|
| 10,002,130 B1* | 6/2018 | Thomas | G16H 10/60 |
| 10,915,570 B2* | 2/2021 | Ramamurthy | G06F 16/433 |
| 11,232,266 B1* | 1/2022 | Biswas | G06F 40/35 |
| 11,372,525 B2* | 6/2022 | Faulkner | H04N 21/4312 |
| 11,488,113 B1* | 11/2022 | Schemers | H04L 12/1818 |

(Continued)

*Primary Examiner* — Richard Z Zhu

(57) ABSTRACT

A computer-implemented method for generating a meeting summary of a meeting session is provided. The method comprises identifying a plurality of sentences spoken during a meeting session. The method further comprises assigning a relevance score to each sentence in the plurality of sentences. The relevance score represents how important each sentence is to the meeting session. The method further comprises generating a set of relevant sentences from the plurality of sentences based upon the relevance score assigned to each sentence and a relevance threshold. The relevance threshold represents a desired level of understanding of content from the meeting session. The method further comprises generating the meeting summary based on the set of relevant sentences and sending the meeting summary to a device associated with a user.

18 Claims, 7 Drawing Sheets

(56) References Cited

U.S. PATENT DOCUMENTS

| | | | |
|---|---|---|---|
| 11,792,032 B2* | 10/2023 | Swerdlow | H04L 12/1822 |
| | | | 709/204 |
| 11,909,786 B2* | 2/2024 | Chun | H04L 67/025 |
| 12,014,737 B2* | 6/2024 | Rahmel | G06N 20/00 |
| 2011/0289080 A1* | 11/2011 | Murdock | G06F 16/3328 |
| | | | 707/E17.014 |
| 2020/0090659 A1* | 3/2020 | Castelli | G06F 16/48 |
| 2020/0374146 A1* | 11/2020 | Chhabra | H04L 12/1822 |
| 2021/0201168 A1* | 7/2021 | Wang | G06N 5/022 |
| 2022/0157301 A1* | 5/2022 | O'Connor | G06F 40/30 |
| 2023/0282224 A1* | 9/2023 | Chun | G10L 21/0232 |
| | | | 381/56 |

* cited by examiner

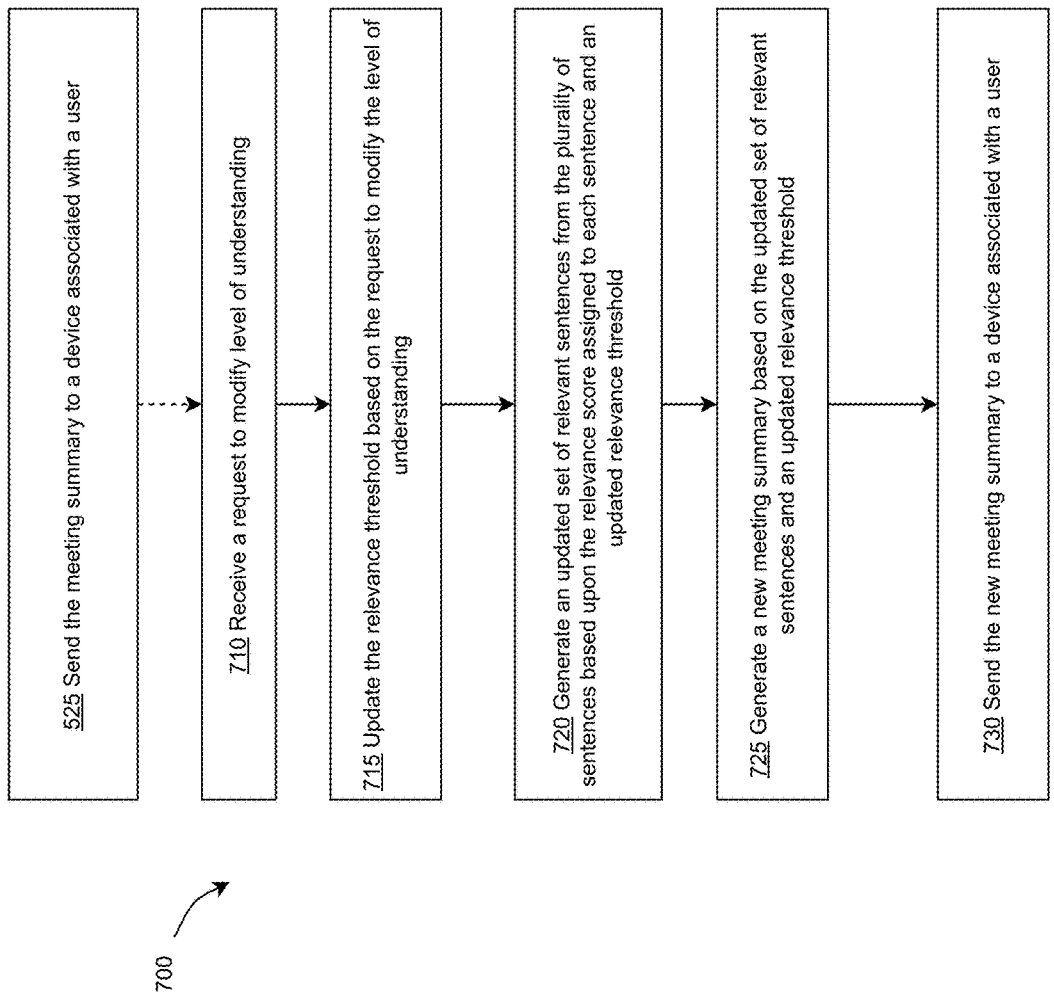

SUMMARIZING MEETING CONTENT WITH ACCURACY CONTROL

TECHNICAL FIELD

The present disclosure relates generally to the field of content data processing. Specifically, the present disclosure relates to systems and methods for generating summaries of meeting content with the ability to vary the level of detail of the summaries.

BACKGROUND

Online meetings have become an essential part of everyday lives. For example, businesses use online meetings to discuss sensitive business matters, students use online meetings to exchange personal ideas and information, and seminars and lectures are conducted as online meetings with the audience being meeting participants. Online meetings may be supplemented with note taking services and algorithms configured to generate a transcript of the meeting. The transcript is useful for users who are unable to attend the meeting live.

However, reviewing a transcript of a meeting afterwards may be time consuming as a user typically has to read the entire transcript to understand what occurred during the meeting. Reading the transcript in its entirety may be beneficial for some users who are not familiar with the subject matter but not beneficial for other users who are familiar with the subject matter. For example, if the meeting is a seminar or webinar on how to design multi-player video games, then users who are unfamiliar with video game design may benefit from reviewing the entire transcript. However, if a user is a game designer and is looking for a summary of the seminar, then reviewing the transcript would be redundant and time consuming as the user may already understand the basics of video game design.

One such solution is to rely on the notes taken by other users who may have attended the seminar live. However, this solution assumes that the notes taken are from users who have the same level of understanding as the user requesting the notes. For example, if the requesting user is a game designer but the notes provided are from users with limited programming knowledge, then the notes may not be beneficial to the requesting user. Similarly, if the notes taken were from an experienced video game designer and the requesting user is new to video game design, then the notes may not be appropriate for the novice video game designer. Another solution is to implement meeting summary software that analyzes a meeting transcript and provides a summary paragraph of the meeting details. However, this solution also suffers from providing either a too detailed summary or a summary that is not detailed enough for the user with respect to the user's desired level of detail. Requesting users that have a good understanding of the meeting subject matter may want meeting summary information that is at a very high level, while requesting users who are new to the subject matter may want to have more comprehensive meeting summary information.

Therefore, there is a need for improved meeting summary generation that is tailored to the desires of the requesting user.

SUMMARY

The appended claims may serve as a summary of the invention.

BRIEF DESCRIPTION OF THE DRAWINGS

FIG. 7 depicts a flowchart for updating a relevance threshold used to generate a meeting summary, according to embodiments.

DETAILED DESCRIPTION

Figure 1:
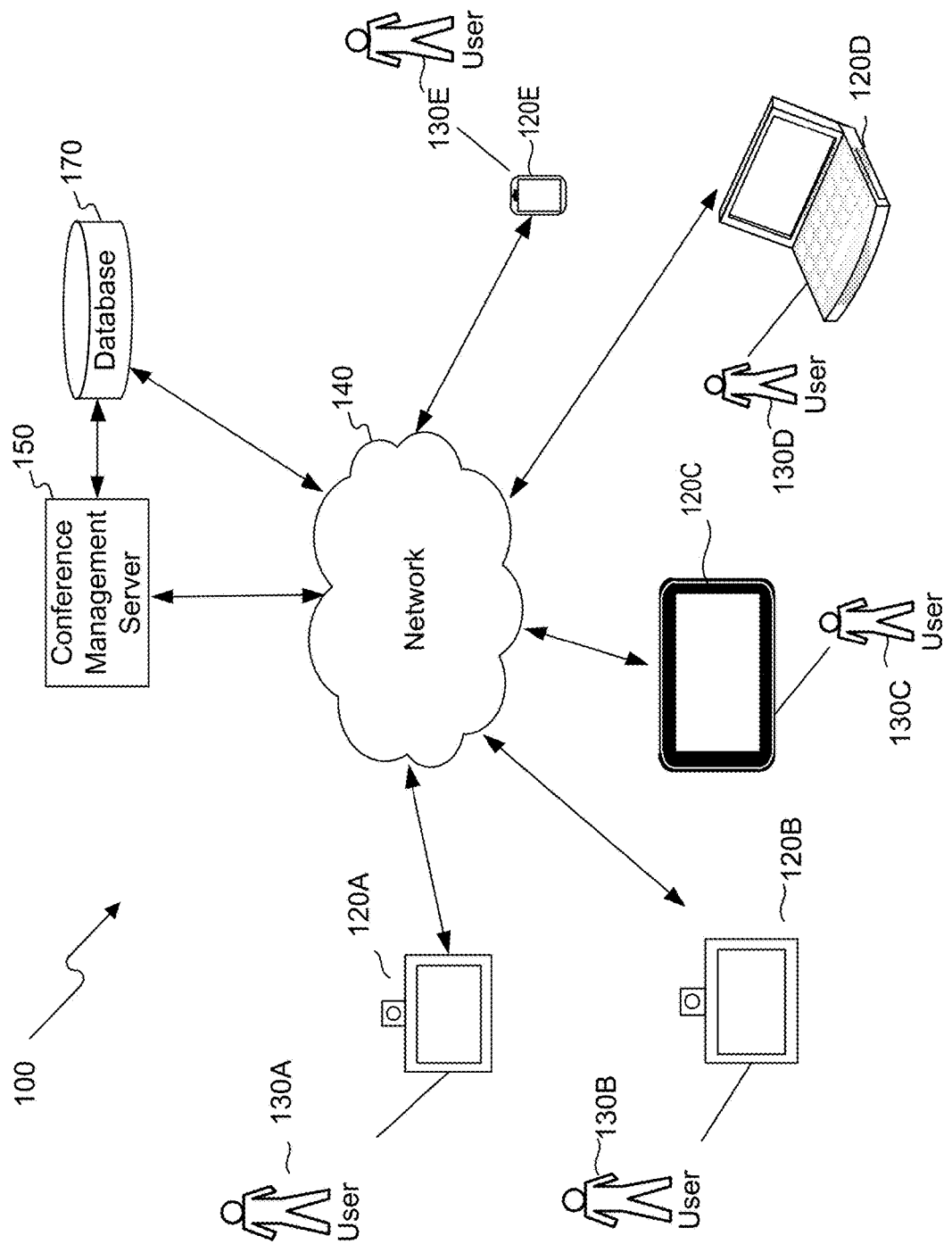
FIG. 1 is an example of a conferencing system in which various embodiments as described herein may be implemented.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

Embodiments are described in sections according to the following outline:
   1.0 General Overview
   2.0 Structural Overview
      2.1 Computer Hardware Overview
   3.0 Functional Overview
      3.1 Content Processing Service
      3.2 Content Identification Service
      3.3 Context Identification Service
      3.4 Context Ranking Service
      3.5 Content Scoring Service
      3.6 Summary Generation Service
      3.7 Machine Learning Model Service
   4.0 Procedural Overview
   5.0 Machine Learning Models 1.0 General Overview Meetings provide an important venue for exchanging information between users. Summarizing important points, decisions, and/or actions during meetings is often performed informally and manually. Services that automatically generate meeting summaries provide help to reduce the manual effort needed to capture important takeaways from the meetings by providing a meeting summary that may be consumed by all users regardless of whether they attended the meeting or not. However, the level of detail provided in an automatically generated meeting summary may not be suitable for different types of users.

The presently described approaches seek to address the issue of a fixed level of detail provided from automatically generated meeting summaries by implementing intelligent meeting summaries that are tailored each user's desired level of understanding of the meeting content. Determining a user's desired level of understanding of the meeting content may be based on the user's expertise, prior meeting summary requests, and/or any other indicator used to determine the optimal level of detail of a meeting summary for the user.

In a conference system that includes a conference management system and a plurality of user devices connected to the conference management system, a user device may generate and send a request for a meeting summary to the conference management system. In an embodiment, user devices may represent computing devices that are configured to execute a web-based application using a web browser. The web-based application may implement Web Real-Time Communications (WebRTC) for participating in a meeting session, for requesting a meeting summary of the meeting session, and for displaying a generated meeting summary. WebRTC enables web browsers with real-time communication using application programming interfaces. WebRTC facilitates real-time audio and video communication within webpages by allowing direct peer-to-peer communication. In another embodiment, computing devices may implement a standalone application configured to participate in a meeting session, request a meeting summary of the meeting session, and display the meeting summary.

A computer-implemented method for generating a meeting summary specific to a user is provided. In an embodiment, the method comprises identifying a plurality of sentences spoken during a meeting session. The method further comprises assigning a relevance score to each sentence in the plurality of sentences identified, where the relevance score represents how important each sentence is to the meeting session. The method further comprises generating a set of relevant sentences based upon the relevance score assigned to each sentence and a relevance score threshold. The relevance score threshold represents a desired level of understanding of content discussed during the meeting session. A meeting summary is then generated based on the set of relevant sentences and the meeting summary is sent to a computing device associated with a user. The computing device may be running a web-based application within a web-browser for interacting with the conference management system. The web-browser may receive the meeting summary and may display the meeting summary on a display screen associated with the computing device.

A non-transitory computer-readable medium storing a set of instructions is also provided. In an embodiment, when the set of instructions are executed by a processor the set of instructions cause: identifying a plurality of sentences spoken during a meeting session; assigning a relevance score to each sentence in the plurality of sentences, wherein the relevance score represents how important each sentence is to the meeting session; generating a set of relevant sentences from the plurality of sentences based upon the relevance score assigned to each sentence and a relevance threshold, wherein the relevance threshold represents a desired level of understanding of content from the meeting session; generating the meeting summary based on the set of relevant sentences; and sending the meeting summary to a device associated with a user.

A network-based system for generating a meeting summary is also provided. The system comprises a processor and a memory operatively connected to the processor. The memory stores instruction that, when executed by the processor, cause: identifying a plurality of sentences spoken during a meeting session; assigning a relevance score to each sentence in the plurality of sentences, wherein the relevance score represents how important each sentence is to the meeting session; generating a set of relevant sentences from the plurality of sentences based upon the relevance score assigned to each sentence and a relevance threshold, wherein the relevance threshold represents a desired level of understanding of content from the meeting session; generating the meeting summary based on the set of relevant sentences; and sending the meeting summary to a device associated with a user.

2.0 Structural Overview

FIG. 1 is an example of a conference system in which various embodiments as described herein may be implemented. System 100 enables a plurality of users to schedule conferences, participate in conferences, and receive notifications regarding conferences. Conferences may include, but are not limited to, meetings, seminars, webinars, online hangouts, live-streamed events, and any other type of meeting that may conducted using system 100. In some examples, one or more components of system 100, such as conference management system 150, may be used to implement computer programs, applications, methods, processes, or other software to perform the described techniques and to realize the structures described herein.

As shown in FIG. 1, system 100 includes one or more user devices 120A-120E (collectively, referred to as user devices 120), a network 140, a conference management system 150, and a database 170. The components and arrangements shown in FIG. 1 are not intended to limit the disclosed embodiments, as the system components used to implement the disclosed processes and features can vary.

The network 140 facilitates communications and sharing of conference scheduling content between user devices 120 (some or all) and the conference management system 150. The network 140 may be any type of networks that provides communications, exchanges information, and/or facilitates the exchange of information between the conference management system 150 and user devices 120. For example, network 140 broadly represents a one or more local area networks (LANs), wide area networks (WANs), metropolitan area networks (MANs), global interconnected internetworks, such as the public internet, public switched telephone networks ("PSTN"), or other suitable connection(s) or combination thereof that enables conference management system 100 to send and receive information between the components of conference management system 100. Each such network 140 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 140 and the disclosure presumes that all elements of FIG. 1 are communicatively coupled via network 140. A network may support a variety of electronic messaging formats and may further support a variety of services and applications for user devices 120.

The conference management system 150 may be a computer-based system including computer system components, desktop computers, workstations, tablets, handheld computing devices, memory devices, and/or internal network(s) connecting the components. The conference management system 150 may be configured to provide conference services, such as setting up conference sessions for users 130A-130E. The conference management system 150 may be configured to receive information from user devices 120 over the network 140, process the information, store the information, and/or transmit conference scheduling information to the user devices 120 over the network 140. Additionally, the conference management system 150 may be configured to analyze meeting content and generate intelligent meeting summary information for users. The conference management system 150 may receive and process content generated from the meeting, identify which content is relevant to the meeting topic, and generate a meeting summary from the relevant content. For example, the conference management system 150 may receive and process recorded meeting audio, recorded meeting video, shared documents, and/or chat history, and identify relevant content based on keywords. The relevant content may then be part of a generated meeting summary that is presented to users. The meeting summary may be beneficial to users who may have missed the meeting or to users who would like a summary of the content discussed during the meeting.

In some implementations, the functionality of the conference management system 150 described in the present disclosure is distributed among one or more of the user devices 120A-120E. For example, one or more of the user devices 120A-120E may perform functions such as determining the degree of formality of the conference, and providing related information to the conference management system, or the other user devices.

In some implementations, the conference management system 150 may include services configured to analyze meeting content and generate an intelligent meeting summary for users. Meeting content may include but is not limited to audio and video recordings and live streams of the meeting, generated transcripts of the meeting, recorded chat sessions during the meeting, as well as any documents or other content presented during the meeting. Additionally, the conference management system 150 may analyze other data associated with the meeting such as, meeting descriptions, meeting invitations, meeting agendas, and meeting invitees, to determine what type of subject matter is relevant to the meeting for the purposes of generating an accurate meeting summary.

The database 170 includes one or more physical or virtual storages coupled with the conference management system 150. The database 170 is configured to store conference information received from user devices 120, profiles of the users 130 such as contact information and images of the users 130, determined degrees of formality of the conferences, data used for determining degrees of formality, and data used for determining deviations from appropriate demeanors associated with a certain degree of formality. The database 170 may further include images, audio signals, and video signals received from the user devices 120. The data stored in the database 170 may be transmitted to the conference management system 150 for information analysis and notification generation. In some embodiments, the database 170 is stored in a cloud-based server (not shown) that is accessible by the conference management system 150 and/or the user devices 120 through the network 140. While the database 170 is illustrated as an external device connected to the conference management system 150, the database 170 may also reside within the conference management system 150 as an internal component of the conference management system 150.

2.1 Computer Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
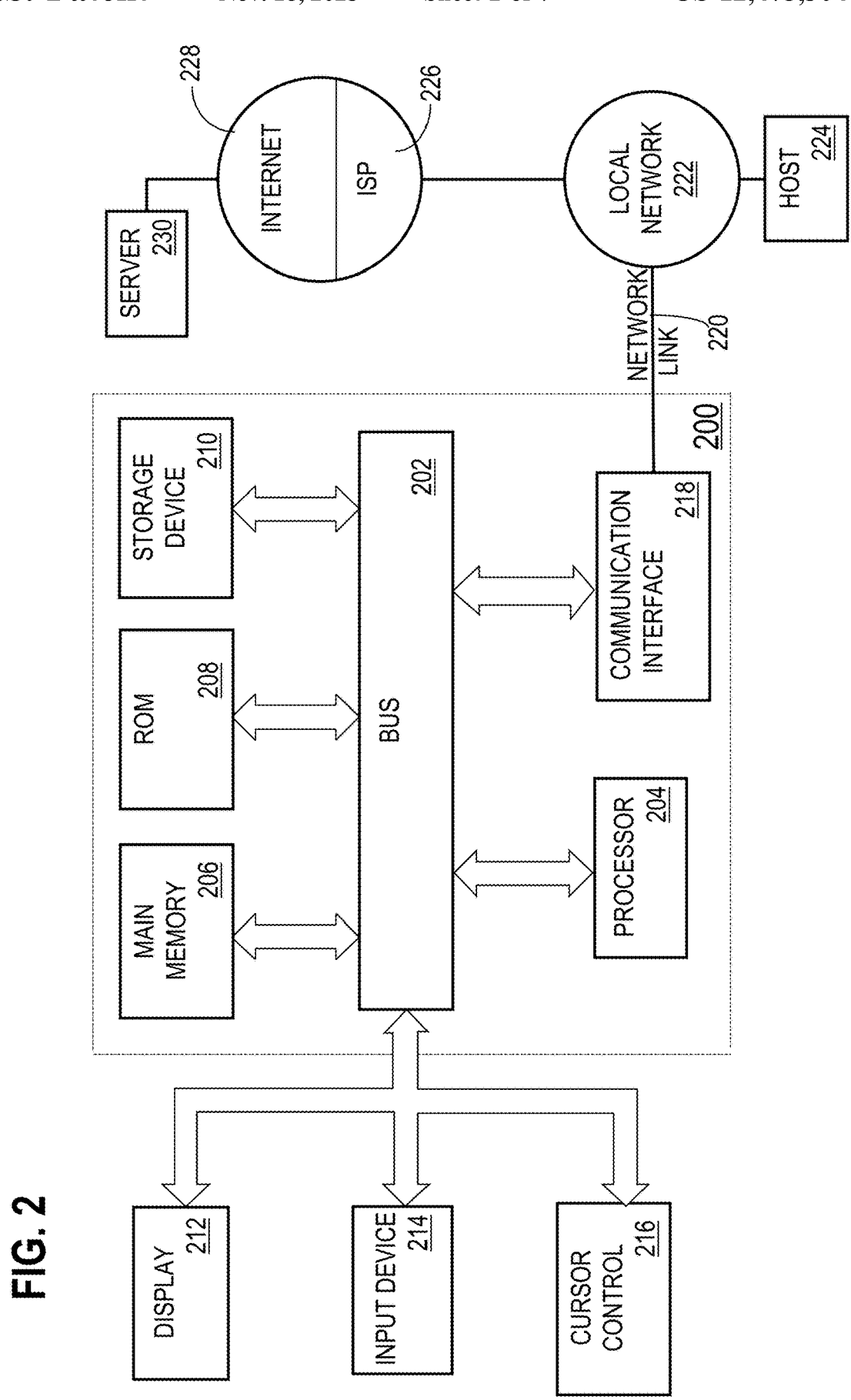
FIG. 2 is a block diagram that depicts an example computer system upon which embodiments may be implemented.

For example, FIG. 2 is a block diagram that illustrates a computer system 200 upon which an embodiment may be implemented. Computer system 200 includes a bus 202 or other communication mechanism for communicating information, and a hardware processor 204 coupled with bus 202 for processing information. Hardware processor 204 may be, for example, a general-purpose microprocessor.

Computer system 200 also includes a main memory 206, such as a random-access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

3.0 Functional Overview

Figure 3:
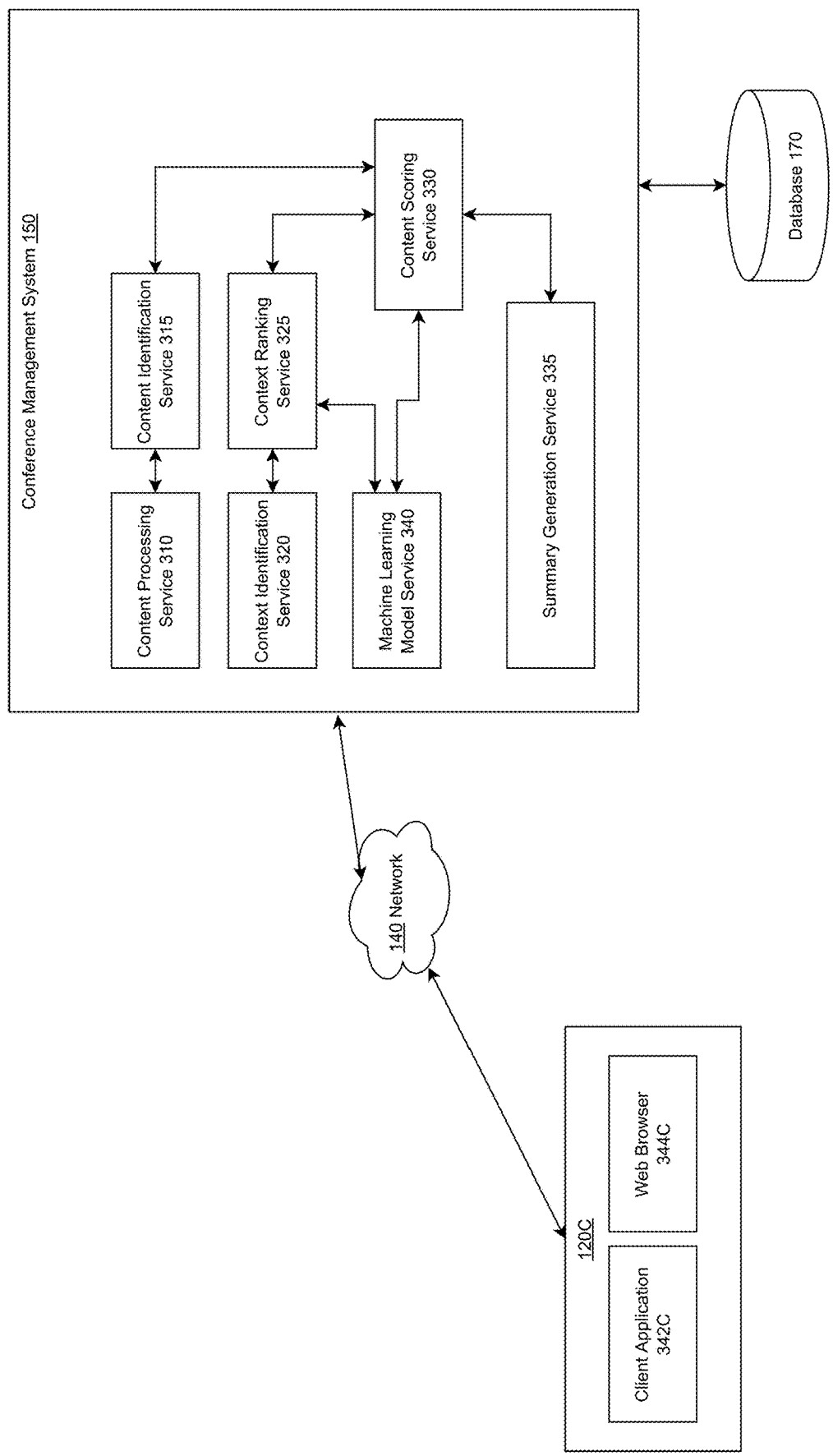
FIG. 3 is an expanded diagram of the conference management system 150 and a user device, according to embodiments.

FIG. 3 is an expanded diagram of the conference management system 150 and a user device, according to embodiments. FIG. 3 depicts the conference management system 150 communicatively connected to user device 120C via network 140. In an embodiment, the conference management system 150 contains sets of instructions, services, or modules which, when executed by one or more processors, perform various functions related to analyzing meeting content and generating an intelligent meeting summary for users. In FIG. 3, the conference management system 150 is configured with a content processing service 310, a content identification service 315, a context identification service 320, a context ranking service 325, a content scoring service 330, a machine learning model service 340, and a summary generation service 335. Each of the services in the conference management system 150 may store and retrieve data from database 170, such as sets of relevant keywords, sets of historical keywords, historical weights assigned to keywords, and any other data needed to process meeting data and meeting content. The conference management system 150 depicted in FIG. 3 represents just one illustrative example of the conference management system 150 and is not intended to be limited to having only the services depicted in FIG. 3. For instance, the conference management system 150 may include fewer or additional services and modules not currently shown in FIG. 3.

User device 120C represents one of the user devices 120 depicted in FIG. 1, the remaining user devices illustrated in FIG. 1 may contain the same components as user device 120C. In an embodiment, user device 120C comprises a client application 342C, and a web browser 344C. In an embodiment, the client application 342C represents a stand-alone application for sending meeting summary requests to the conference management system 150 and receiving meeting summaries from the conference management system 150. In an embodiment, the web browser 344C represents a standard web browser that may be used to display a graphical user interface, provided by the conference management system 150, for sending meeting summary requests to and receiving meeting summaries from conference management system 150.

3.1 Content Processing Service

In an embodiment, the content processing service 310 is configured to receive content data associated with the meeting session and convert the content data into a format that may be parsed and analyzed by the content identification service 315. For example, the content data may represent recorded audio and/or video of the meeting session, data files of content presented during the meeting session such as documents and presentation slides, chat session transcripts between users who attended the meeting, and any other type of content data used or presented during the meeting. In an embodiment, the content data may be an audio and/or video file of the recorded meeting session. In another embodiment, the content data may be streaming audio and/or video from the meeting session. The streaming audio and/or video may be processed by the content processing service 310 in real time while the meeting session is occurring.

In an embodiment, the content processing service 310 may implement various speech-to-text algorithms to convert received audio/video into a text transcript of the meeting session. For example, if the content data received is an audio recording of the meeting session, the content processing service 310 may analyze the audio recording and generate a corresponding transcript of the meeting session. Similarly, if the content data received is an audio stream of an ongoing meeting session, the content processing service 310 may generate a real time text transcript from the audio stream as it is being received. In other examples, the content processing service 310 may generate formatted text files for other types on content such as presentation slides or provided documents and spreadsheets. For example, the content processing service 310 may implement Optical Character Recognition (OCR) to scan various documents in order to recognize text within the documents, spreadsheets, presentation slides, or any other documents. The generated text transcripts and other text files may be provided to the content identification service 315 to parse and identify sentences and keywords from the generated text files.

3.2 Content Identification Service

In an embodiment, the content identification service 315 is configured to identify sentences and keywords from the text files received from the content processing service 310. For example, the content identification service 315 may receive a text transcript of the meeting session audio and may parse the text transcript to identify a plurality of sentences. The content identification service 315 may further identify sets of words within each sentence. For example, the content identification service 315 may implement a keyword-based parser, a grammar-based parser, a statistical parser, or any other text parser to recognize keywords within the text files. A keyword-based parser may represent a parser that identifies words, phrases, and simple patterns within text. A grammar-based parser is a parser that uses a set of grammatical rules to determine context of words within the text. A statistical-based parser is a parser that implements numerical text models to identify keywords and their context within a block of text.

3.3 Context Identification Service

In an embodiment, the context identification service 320 is configured to receive meeting data associated with meeting session and identify a set of keywords related to the purpose of the meeting. The meeting data may represent information describing the purpose of the meeting and any other details about the meeting. The meeting data may include the meeting title of the meeting or the subject of a conference/seminar/webinar, a meeting summary included in the meeting invitation, any attachments attached to the meeting invitation, the scheduled time of the meeting, and an agenda of the meeting. The keywords identified may be based on an overall meeting topic and historical keywords associated with the overall meeting topic. The overall meeting topic may be identified from the meeting title in a meeting invitation. For instance, if the meeting title is "Using artificial intelligence to optimize text parsing", then the context identification service 320 may determine that the overall meeting topic is related to "artificial intelligence" and "text parsing". Meeting titles may describe the overall purpose of the meeting. The context identification service 320 may use keywords from the meeting title to determine the overall meeting topic. The context identification service 320 may identify additional keywords that are related to "artificial intelligence" and "text parsing" based on historical keywords that are typically associated with the meeting topic. In an embodiment, database 170 may store sets of related keywords that are related to each other and are related to relevant topics based on historical keyword identification and analysis by the conference management system 150. Database 170 may store the sets of related keywords within a word matrix, word cluster, or any other data structure in which related words may be sorted based on how closely related each word is to other words. For example, keywords such as machine learning, neural networks, linear regression may be historically associated with "artificial intelligence" and shallow parsing, chunking, lexical analysis, and syntax may be historically associated with "text parsing". Relationships between keywords may be based on previously recorded meetings, historical relationships between keywords and topics derived from meeting materials as well as any other documents related to a particular topic of interest. The context identification service 320 may determine a set of historical keywords associated with the meeting topic by retrieving the set of related keywords from database 170. In the absence of database 170 having previously stored set of related keywords, the context identification service 170 may analyze historical meeting data, stored in database 170, to determine which historical keywords have been historically associated with specific topics in meetings.

In an embodiment, the context identification service 320 is configured to analyze meeting data and parse text related to the overall meeting topic. The context identification service 320 may parse text of the meeting data to generate a list of keywords that may be relevant to the overall meeting topic. Each keyword in the list may include metadata, generated by the context identification service 320, that describes where the keyword was identified, such as whether the keyword was identified in the meeting title, meeting summary, as a heading in an attached agenda, or in the scheduled time description. The keyword location metadata may be used when assigning weights to keywords. For example, if a keyword was located in the meeting title, then it may be assigned greater weight, while a keyword located in the schedule time description may be assigned lesser weight. The context identification service 320 may send the list of keywords and the set of historical keywords to the context ranking service 325 in order to determine which keywords are relevant to the meeting.

3.4 Context Ranking Service

In an embodiment, the context ranking service 325 is configured to identify relevant keywords in the list of keywords based on the context of the keywords and their historical association to the overall meeting topic. The context ranking service 325 may assign different weights to each keyword based on their importance to the overall meeting topic. The importance of each keyword may be based on their relative location within the meeting data and their historical association with the meeting topic. Relative location may include whether the keyword is part of the subject line of the meeting invitation, is located in the meeting description, is in the agenda, the frequency of the keyword in the meeting data, as well as the formatting associated with the keyword. For example, if the keyword is part of the meeting invitation subject line, then the keyword may be given a higher weight. If the keyword is found in multiple places in the meeting invitation and/or the meeting agenda, then the keyword may be given greater weight. Additionally, if the keyword has a font size that is relatively larger than the remaining text then the keyword may be given a higher weight. Alternatively, if the keyword, only shows up once in the meeting data, or is only found in the time schedule section of the meeting invitation, then the keyword may be given lesser weight. The context ranking service 325 may determine location information for each keyword from metadata associated with each keyword, where the metadata has been generated by the context identification service 320. The metadata may contain location information about where each keyword was identified within the meeting data. Historical association to the overall meeting topic may be used to assign either greater or lesser weight. If a keyword matches an historical keyword that is closely associated with the overall meeting topic, then the keyword may be assigned a higher weight. For example, if the keyword is "machine learning" and "machine learning" is historically associated to the meeting topic, "artificial intelligence", then the keyword may be assigned a higher weight.

In an embodiment, historical keywords not found in the meeting data may still be assigned a weight based on their historical association to the overall meeting topic. For instance, historical keywords such as "neural network" and "linear regression" may be assigned a higher weight value as they are closely associated with "artificial intelligence".

In an embodiment, the context ranking service 325 may use a 0.0 to 1.0 weighting scale to apply different weights to each of the keywords from the meeting data and the set of historical keywords, where keywords given the highest weight would be assigned a weight of 1.0, keywords given neutral weight are assigned 0.5, and keywords given the least amount of weight are assigned 0.0 or 0.1. For example, if the meeting topic is "artificial intelligence" and the following keywords have been identified in the meeting invitation (machine learning, prediction, Monday, and goals), then the context ranking service 325 may assign the greatest weight, 1.0, to the "machine learning" and "prediction" keywords as they have been historically associated with artificial intelligence. The keyword "Monday" may be assigned the least weight, either 0.0 or 0.1, as it may have been located in the scheduling section of the meeting invitation and "Monday" has not historically been associated with artificial intelligence. The keyword "goals" may be assigned a neutral weight, 0.5, as it may not be deemed more or less important as the other keywords. However, if the keyword "goals" was located in the agenda, then the context ranking service 325 may assign a slightly greater weight such as 0.65. Embodiments of the weighting scale are not limited to the examples described above. Other embodiments may use different weighting scales such as 1 to 5, 0 to 10, or any other scaling metric to rank the keywords. In an embodiment, the context ranking service 325 may implement a machine learning model to assign weight values to the keywords based on their importance to the overall meeting topic. Additional details for implementing the machine learning model are described in the MACHINE LEARNING MODEL SERVICE section herein.

In an embodiment, the context ranking service 325 may select the keywords that have an assigned weight value above a threshold to be part of a set of relevant keywords. For example, the context ranking service 325 may only select keywords that have a weight above 0.2 as relevant keywords. The context ranking service 325 may be configured to adjust its threshold for relevant keywords based on the number of keywords identified. For example, if the meeting data only has 20 keywords that have been assigned weights, then the context ranking service 325 may select all of the identified keywords. Conversely, if the meeting data contained 200 keywords, then the context ranking service 325 may only select keywords with a weight above the threshold as relevant keywords. In another embodiment, the context ranking service 325 may be configured to select the top percentage of keywords from the meeting data. For instance, if the number of keywords identified is 500, then the context ranking service 325 may be configured to select only the top 30% of keywords based on their weight value as relevant keywords. The context ranking service 325 may send the set of relevant keywords and their associated weights to the content scoring service 330 to be used to score the meeting content. As an illustrative example, the context ranking service 325 may generate the following set of relevant keywords and their associative weights as:

[artificial intelligence, weight=1.0;
machine learning, weight=0.9;
linear regression, weight=0.85;
prediction, weight=0.6;
output, weight=0.45;
Monday, weight=0.05]

where the meeting topic for this set is "artificial intelligence" and the weight scale is based on a range between 0.0 and 1.0. Keywords such as artificial intelligence, machine learning, and linear regression are closely related to the meeting topic and have greater assigned weights. These weights may be used by the content scoring service 330 to assign a score to sentences that contain specific keywords that are more important that other keywords.

3.5 Content Scoring Service

In an embodiment, the content scoring service 330 is configured to assign relevance scores to sentences identified by the content identification service 315. The relevance score represents how relevant the sentence is to the overall meeting topic. For instance, if a sentence contains the keywords "machine learning" and "neural network", then the sentence would be relevant to the overall meeting topic of "artificial intelligence". The content scoring service 330 may receive as input the set of relevant keywords and their associated weights, from the context ranking service 325, and the plurality of sentences identified from the content data by the content identification service 315. The content scoring service 330 produces, as output, assigned relevance scores for each of the plurality of sentences.

In an embodiment, the content scoring service 330, for each sentence of the plurality of sentences, determines whether the sentence contains keywords that match and/or are closely related to relevant keywords in the set of relevant keywords. If there are multiple keywords in the sentence that match relevant keywords, then the sentence would be assigned a higher relevance score. Additionally, the relevance score assigned to the sentence may depend on the weights associated with the matching relevant keywords. For example, if the sentence contains the keyword "machine learning" which is a relevant keyword that has a higher weighted value, then the sentence may be assigned a higher relevance score based on the higher weighted value for "machine learning". Conversely, if the sentence contains the keyword "output" which is a relevant keyword with a lower weighted value, then the sentence may be assigned a lower relevance score based on the lower weighted value for "output".

In an embodiment, the content scoring service 330 may implement the use of a machine learning relevance scoring model (ML relevance scoring model) to assign relevance scores. The machine learning model may be trained and provided by the machine learning model service 340. The ML relevance scoring model may be configured to receive, as input, the set of relevant keywords and their corresponding weight values and the plurality of sentences representing the content data. The output of the ML relevance scoring model is a scored set of sentences with corresponding relevance scores. The ML relevance scoring model may be trained to assign relevance scores based on the frequency of relevant keywords in a sentence, the weight assigned to each matching relevant keyword, and historical associations between the matching keywords and the overall meeting topic. Details for training the ML relevance model are described in the MACHINE LEARNING MODEL SERVICE herein.

In another embodiment, the content scoring service 330 may be configured to implement a one-to-one keyword matching where the content scoring service 330 assigns a relevance score based on the number of relevant keywords found in a sentence. For instance, the content scoring service 330 may analyze a sentence and find that the sentence contains 3 keywords that match relevant keywords. The content scoring service 330 may then assign a relevance score that is based on the number of keyword matches. That is, a sentence that contains three matching keywords would receive a higher relevance score than a sentence that contained only one matching keyword, provided that the associated weights for the relevant keywords are the same.

In an embodiment, the one-to-one keyword matching implemented by the content scoring service 330 may also incorporate the weighted values assigned to the set of relevant keywords to determine relevance scores for sentences. The content scoring service 330 may assign a relevance score to a sentence based on the number of relevant keywords found in a sentence and the weighted values assigned to each of the matching relevance scores. Using the above example, the relevance score assigned to the sentence with three matching keywords would also be based on the weighted values of those three matching relevant keywords.

In another embodiment, the content scoring service 330 may be configured to implement fuzzy string matching to determine whether there are keywords that match relevant keywords in the set of relevant keywords. Fuzzy string matching is a technique that matches keywords based on a partial string match rather than an exact string match. For example, if a sentence contains the keyword "machine-learned" and the set of relevant keywords contains the relevant keyword "machine learning", the content scoring service 330, using fuzzy string matching, would consider this a match based on a partial string matching of "machine" and "learn". The content scoring service 330 may be configured to determine how closely the two keywords are to one another and then determine whether the two keywords are close enough to be identified as similar. The closeness required for two keywords to match may be configured or tuned depending on the overall meeting topic and the set of relevant keywords. For example, if the meeting topic and the set of relevant keywords contain keywords with a lot of variation in spelling and usage, such as "machine learning", "machine-learning", "machine learned", "machine-learned", "ML", "learning model", then the fuzzy matching algorithm may be tuned to identify matches with larger variation between keywords.

In an embodiment, the content scoring service 330 may implement the following scoring algorithm:

$$\text{Raw Score}_{Sentence} = \Sigma(KW_{weight}) * \text{Point}_{score\ factor}$$

where Raw Score$_{Sentence}$ represents a raw score assigned to a particular sentence. The Raw Score$_{Sentence}$ is a sum of the matching keywords in the sentence where the weight of each keyword is multiplied by the Point$_{score\ factor}$, which represents a point value given for each matching keyword. Using the example where the set of relevant keywords and their associative weights are:
 [artificial intelligence, weight=1.0;
 machine learning, weight=0.9;
 linear regression, weight=0.85;
 prediction, weight=0.6;
 output, weight=0.45;
 Monday, weight=0.05], the following sentences may be scored as follows. The first sentence of "The model using linear regression produced favorable output." contains the keywords "linear regression" and "output". The content scoring service 330 would produce the following raw score using a Point$_{score\ factor}$=10:

$$\text{Raw Score}_{First\ Sentence} = (\text{linear regression}(0.6)*10) + (\text{output}(0.45)*10) = 10.45$$

The second sentence of "Monday, is a good day for a meeting." contains the keyword "Monday". The content scoring service 330 would produce the following raw score:

$$\text{Raw Score}_{Second\ Sentence} = (\text{Monday}(0.05)*10) = 0.5$$

The first sentence contains multiple keywords that each have higher assigned weights resulting in a higher raw score of 10.45 for the sentence. The second sentence, however, contains a single keyword with a low assigned weight, resulting in a lower raw score of 0.5. Embodiments are not limited to this scoring algorithm and may implement any other type of algorithm that factors in the number of keywords in each sentence and their associated keyword weights.

In an embodiment, the content scoring service 330 may be configured to scale each of the assigned raw scores based on a 0-to-100 relevance scoring scale, where sentences that have high relevance based on the number and type of matches are assigned a higher score on the relevance scoring scale and sentences that have lower relevance based on the number and type of matches are assigned a lower score. The content scoring service 330 may scale the raw scores by assigning the highest raw score to the highest scaled score and the lowest raw score to the lowest scaled score. Using the previous example for calculating raw scores, the content scoring service 330 may scale the raw scores of the first and second sentence using a 0-to-100 relevance scoring scale. The first sentence had the highest score of 10.45 and may be assigned the highest relevance score of 100, while the second sentence had the lowest score of 0.5 and may be assigned the lowest relevance score of 0. The highest and lowest raw scores are used to define the range of relevance scores. Raw scores for other sentences may be scaled according to how the first and second sentences have been scaled. Embodiments of the relevance scoring scale are not limited to a 0-100 scale. The content scoring service 330 may be configured to use any type of scoring scale including, but not limited to, a 0.0-to-1.0 scale, a 0-to-10 scale, a 0-to-1000 scale, and so on.

3.6 Summary Generation Service

In an embodiment, the summary generation service 335 is implemented to generate a meeting summary based upon the plurality of sentences identified and their corresponding relevance scores. The summary generation service 335 may receive from the content scoring service 330 the plurality of sentences from the content data and their corresponding relevance scores. The summary generation service 335 may be configured to use a relevance threshold to determine which sentences in the plurality of sentences are relevant to the overall meeting topic and should be incorporated into the meeting summary.

The relevance threshold is a minimum relevance scoring value that represents the desired level of detail for the meeting summary. A higher relevance threshold value would filter out sentences that are not relevant enough to the overall meeting topic based on their corresponding relevance score. For example, the following sentences have been assigned the following relevance scores:

| | Sentence | Relevance score |
|---|---|---|
| 1 | The model using linear regression produced favorable output. | 100 |
| 2 | Monday is a good day for a meeting. | 0 |
| 3 | Neural networks are good for image recognition. | 77 |
| 4 | What is a model that doesn't need training? | 58 |

If the relevance threshold is set to 60% (60 out of the 100-point scale), then sentences 2 and 4 would be filtered out and sentences 1 and 3 would be included in the meeting summary.

In an embodiment, the relevance threshold may be a configurable value that is based on the requesting user's preferences. For example, a user requesting a meeting summary may specify a relevance threshold corresponding to a 60% level of understanding of the meeting content. The summary generation service 335 may set the relevance threshold based on the user's request such that about 60% of the sentences are identified as relevant. In another embodiment, the relevance threshold value may be based upon historical relevance threshold values previously used by the requesting user. For example, if previously, the requesting user has requested 70% level of understanding for the meeting summary, then the summary generation service 335 may automatically preselect a relevance threshold value corresponding to a 70% level of understanding.

In another embodiment, the relevance threshold value may be based upon historical relevance threshold values previously used to generate meeting summaries. The historical relevance values may be based on topic-specific historical relevance values. For example, if historically, a relevance threshold value for "artificial intelligence" topics corresponds to a 70% level of understanding, then the summary generation service 335 may automatically set the relevance threshold value to correspond to the 70% level of understanding.

In yet another embodiment, the relevance threshold value may be based upon historical relevance threshold values from requesting users that have similar skills and a similar background to the current requesting user. For example, if the current requesting user is a computer scientist specializing in machine learning models, then the summary generation service 335 may configure the relevance threshold value to correspond to a value historically chosen by other computer scientists and/or other computer scientists specializing in machine learning models.

The summary generation service 335 uses the relevance threshold to generate a set of relevant sentences that may be used to generate a meeting summary for the meeting session. In an embodiment, upon generating the set of relevant sentences, the summary generation service 335 may use text-based analysis to generate a meeting summary. For instance, the summary generation service 335 may use natural language processing to identify portions of the set of relevant sentences that should be included in the meeting summary. The meeting summary may include sentences from the set of relevant sentences, as well as portions of sentences from the set of relevant sentences to make up the meeting summary.

In an embodiment, the summary generation service 335 may also include within the meeting summary the set of relevant sentences. For example, the meeting summary may contain a summarized block of text derived from the set of relevant sentences and the set of relevant sentences.

In yet another embodiment, the summary generation service 335 may include within the meeting summary the summarized block of text derived from the set of relevant sentences and attached copies of transcripts of the content data, where the sentences from the set of relevant sentences are highlighted, underlined, or otherwise emphasized. This allows a requesting user to view the context of a relevant sentence in the meeting session, in addition to the meeting summary.

In an embodiment, a user may modify the relevance threshold after the meeting summary has been generated. The summary generation service 335 may receive input from the user specifying a new relevance threshold. The summary generation service 335 may modify the relevance threshold value to correspond to the new relevance threshold. For example, if the relevance threshold originally used by the summary generation service 335 is 60% and the new relevance threshold received specifies 70%, then summary generation service 335 would update the relevance threshold and generate a new meeting summary based on the updated relevance threshold.

3.7 Machine Learning Model Service

In an embodiment, the machine learning model service 340 is configured to generate and train machine learning models for the conference management system 150. The machine learning models may be implemented using one or more of: Artificial Neural Networks (ANN), Deep Neural Networks (DNN), XLNet for Natural Language Processing (NLP), General Language Understanding Evaluation (GLUE), Word2Vec, Convolution Neural Networks (CNN), Long Short-Term Memory (LSTM) networks, Gated Recurrent Unit (GRU) networks, Hierarchical Attention Networks (HAN), or any other type of machine learning model. The machine learning models listed herein serve as examples and are not intended to be limiting. Further details describing implementations of different machine learning models is described in the MACHINE LEARNING MODELS OVERVIEW section herein.

In an embodiment, the content scoring service 330 may implement the ML relevance scoring model provided by the machine learning model service 340. The ML relevance scoring model which is configured to assign relevance scores to sentences derived from content data. The input for the ML relevance scoring model includes the set of relevant keywords and their corresponding weight values and the plurality of sentences representing the content data. The output of the ML relevance scoring model is a set of sentences having corresponding relevance scores. Training data for the ML relevance scoring model may include a set of relevant keywords, their corresponding weight values, a plurality of training sentences, and pre-calculated relevance scores for the set of training sentences.

Figure 4:
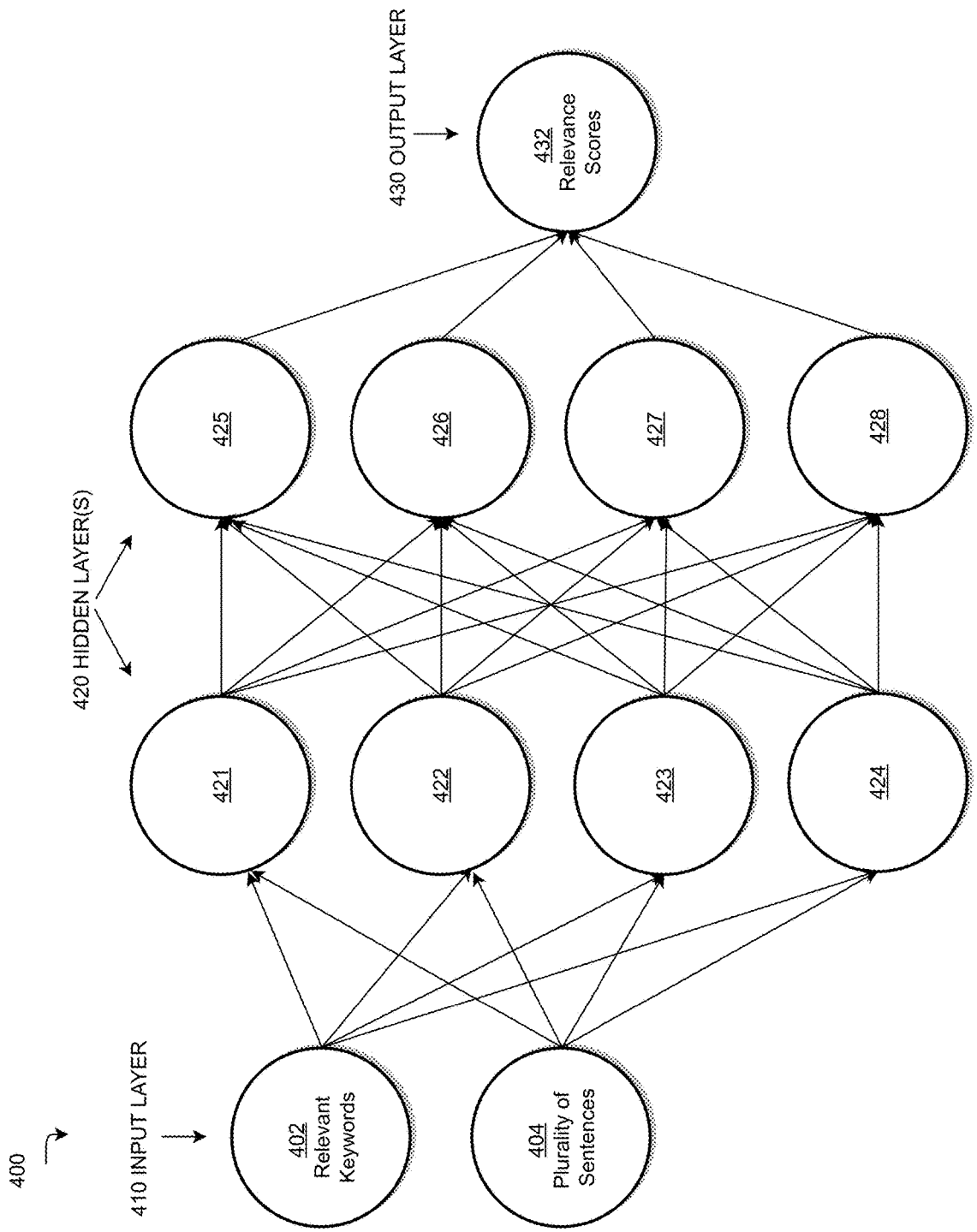
FIG. 4 is a relational node diagram depicting an example of a deep neural network, according to embodiments.

FIG. 4 represents a relational node diagram 400 depicting an example of a deep neural network that is trained to calculated relevance score for input sentences based on a set of relevant keywords and their corresponding weight values, according to embodiments. FIG. 4 is described as a structured learning neural network model. The depiction of the model in FIG. 4 is one example of a structured learning neural network model and is not intended to be limiting.

In the example of FIG. 4, the input layer 410 includes the set of relevant keywords 402 and their corresponding weight values, the plurality of sentences 404 from the content data, as well as any other relevant input data. In some embodiments, the input data may be live data from an audio or video stream that is accumulated and transcribed in real time. In other embodiments, the plurality of sentences may be transcribed audio/video text that has been saved in the database 170. The trained AI model is applied to the plurality of sentences in order to calculate relevance scores for the plurality of sentence at the output layer 430.

Hidden layers 420 represent various computational nodes 421, 422, 423, 424, 425, 426, 427, 428. The lines between each node 421, 422, 423, 424, 425, 426, 427, 428 represent weighted relationships based on a weight matrix. While the embodiment of FIG. 4 features two hidden layers 420, the number of hidden layers is not intended to be limiting. For example, one hidden layer, three hidden layers, ten hidden layers, or any other number of hidden layers may be used for a standard or deep neural network. The output layer 430 includes the relevance scores 432 for each of the plurality of sentences determined by the neural network as the known output.

In an embodiment, the context ranking service 325 may implement a machine learning context ranking model (ML context ranking model) that is configured to assign weighted values to each relevant keyword based on their importance to the overall meeting topic. Input for the ML context ranking model includes: a set of relevant keywords from the meeting data; their relative contextual location in the meeting data, such as whether relevant keywords are located in the meeting subject line, meeting description, meeting agenda, and so on; any formatting information that may indicate their relative importance; and the overall meeting topic. Output for the ML context ranking model is corresponding weight values indicating the relative importance of each relevant keyword. In an embodiment, the ML context ranking model may by trained using a training data set of relevant keywords, contextual information for the training data set, and defined weight values for the training data set of relevant keywords.

4.0 Procedural Overview

Figure 5:
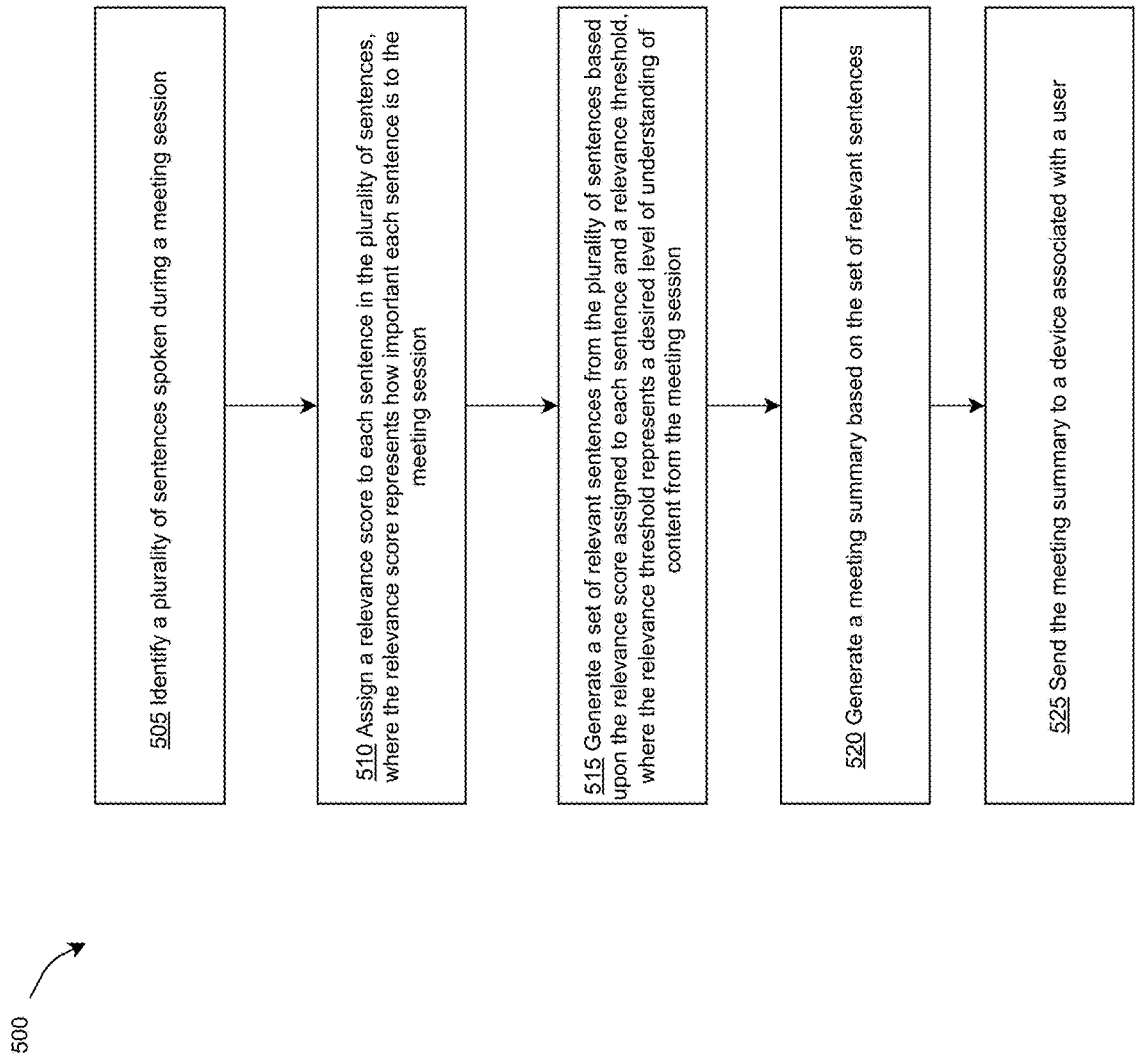
FIG. 5 depicts a flowchart for generating a meeting summary of a meeting session and sending the meeting summary to a device, according to embodiments.

FIG. 5 depicts a flowchart for generating a meeting summary of a meeting session and sending the meeting summary to a device, according to embodiments. Process 500 may be performed by a single program or multiple programs. The steps of the process as shown in FIG. 5 may be implemented using processor-executable instructions that are stored in computer memory. For the purposes of providing a clear example, the steps of FIG. 5 are described as being performed by computer programs executing on the conference management system 150. For the purposes of clarity process 500 is described in terms of a single entity.

In an embodiment, a user using user device 120, which may be running a web-browser-based conferencing application, may request a meeting summary for a meeting session. For example, the user may cause web browser 344C to generate and send the request for the meeting summary to conference management system 150. In another embodiment, client application 342C, running on user device 120C, may generate and send the request for the meeting summary to conference management system 150. The meeting session may represent a conventional online meeting between users, a presented seminar or webinar, or a multi-day conference. Content data for the meeting session may include, but is not limited to, an audio recording of the meeting session, a video recording of the meeting session, and any presented materials from the meeting session. The content data may be completed content data in the form of a recorded file if the meeting session has already concluded. Alternatively, a user may request the meeting summary while the meeting session is in progress. In this scenario, the content data may be streaming audio or video of the meeting session.

In an embodiment, the content processing service 310 may receive the content data and convert the content data into text. For instance, an audio recording of what was spoken during the meeting session may be converted into a meeting session transcript.

At step 505, process 500 identifies a plurality of sentences spoken during the meeting session. In an embodiment, the content identification service 315 identifies the plurality of sentences spoken during the meeting session. For example, the content identification service 315 receives a meeting session transcript from the content processing service 310. The meeting session transcript may represent speech from users during the meeting session. Additionally, the content identification service 315 may receive additional content data, such as presented documents from the meeting session and a chat session occurring during the meeting session.

In an embodiment, if the user request for the meeting summary is for an ongoing meeting session, then the content identification service 315 may receive a stream of text representing sentences spoken during the ongoing meeting session.

At step 510, process 500 assigns a relevance score to each sentence in the plurality of sentences, where the relevance score represents how important each sentence is to the meeting session. In an embodiment, the content scoring service 330 assigns relevance scores to each sentence using a set of relevant keywords determined by the context ranking service 325.

In an embodiment, the context identification service 320 receives meeting data associated with the meeting session. The meeting data may represent information describing the purpose of the meeting, such as a meeting invitation, an agenda, and any other details about the meeting that may be relevant to the overall meeting topic. For example, the meeting invitation may include a subject heading, a meeting description, an attached agenda, meeting invitees, and scheduling information. In this example, the meeting data is the meeting invitation which may include a subject heading of "Artificial Intelligence Optimization techniques" and a meeting description of "This meeting is a presentation of my work optimizing our neural network for image recognition. Specifically, I will discuss the advantages of using a focused training set over a large corpus of images." The context identification service 320 may identify keywords from the meeting data that may be relevant to the overall meeting topic. For example, the context identification service 320 may identify relevant keywords from the meeting invitation as "neural network", "training set", "artificial intelligence", and "optimization".

In an embodiment, the content ranking service 325 may assign weights to each keyword based on their importance to the overall meeting topic. For example, the keywords "artificial intelligence" and "optimization" may be assigned the highest weight, 1.0 out of a 0-to-1 scale, as these keywords were identified from the subject heading of the meeting invitation. The keywords "neural network" and "training set" may be assigned a lower weight, such as 0.7, as these keywords are important but not as important as the keywords located in the subject heading. The weights assigned to the relevant keywords are then used by the content scoring service 330 to assign a relevance score to each sentence in the plurality of sentences.

Figure 6:
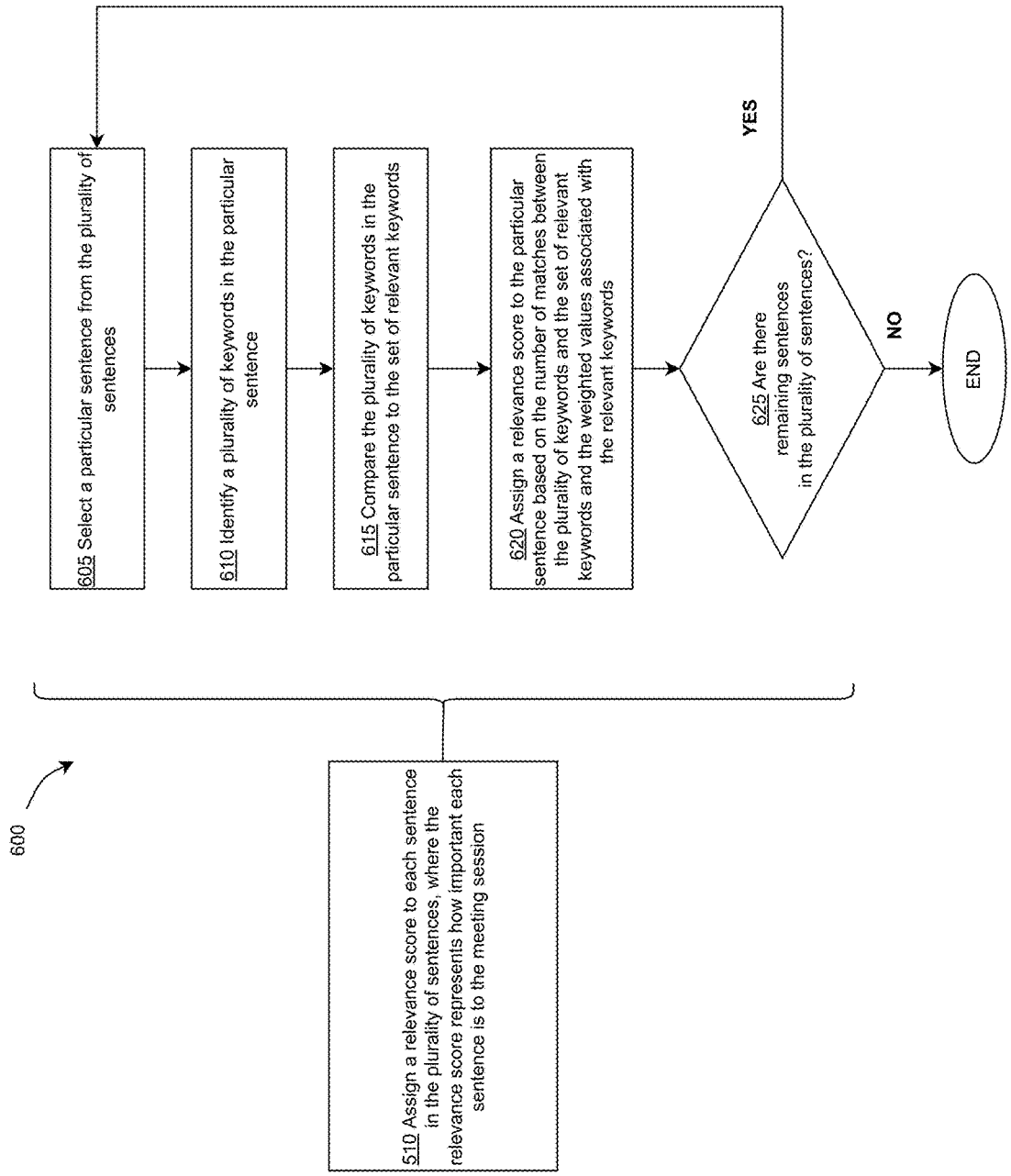
FIG. 6 depicts a flowchart for assigning a relevance score to each of the plurality of sentences, according to embodiments.

FIG. 6 depicts a flowchart for assigning a relevance score to each of the plurality of sentences, according to embodiments. Process 600 may be performed by a single program or multiple programs. The steps of the process as shown in FIG. 6 may be implemented using processor-executable instructions that are stored in computer memory. For the purposes of providing a clear example, the steps of FIG. 6 are described as being performed by computer programs representing the content scoring service 330. For the purposes of clarity process 600 is described in terms of a single entity.

In an embodiment, the content scoring service 330 analyzes each sentence in the plurality of sentences to assign a relevance score to each sentence. At step 605, process 600 selects a particular sentence from the plurality of sentences. In an embodiment, the content scoring service 330 receives the plurality of sentences and selects a particular sentence to analyze and assign a relevance score.

At step 610, process 600 identifies a plurality of keywords in the particular sentence. In an embodiment, the content scoring service 330 identifies the keywords in the particular sentence. For example, if the selected sentence is "Optimizing a model using a small training set may lead to skewed predictions", the content scoring service 330 may identify the keywords as "optimizing", "model", "small", "training set", "skewed", and "predictions".

The keywords "optimizing" and "training set" as potentially relevant keywords. Even though the set of relevant keywords includes "optimization", the content scoring service 330 may be implemented to identify word variations such as optimize, optimizing, and optimized as being related to the relevant keyword optimization.

At step 615, process 600 compares the plurality of keywords in the particular sentence to the set of relevant keywords. In an embodiment, the content scoring service 330 compares the plurality of keywords to the set of relevant keywords received from the context ranking service 325. The comparison may be based on a one-to-one string match, various fuzzy string-matching techniques, or any other available string-matching technique. Using the above example, the set of relevant keywords includes "neural network", "training set", "artificial intelligence", and "optimization", and the keywords identified include "optimizing", "model", "small", "training set", "skewed", and "predictions". The content scoring service 330 may determine that the keywords "optimizing" and "training set" match the set of relevant keywords.

At step 620, process 600 assigns a relevance score to the particular sentence based on the number of matches between the plurality of keywords and the set of relevant keywords and the weighted values associated with the relevant keywords. In an embodiment, the content scoring service 330 determines how many keywords from the particular sentence match with the set of relevant keywords. For each match, the content scoring service 330 considers the weighted value associated to each matched relevant keyword. Based on the number of matches and the associated weights of the matched relevant keywords, the content scoring service 330 assigns a relevance score to the particular sentence. Using the current example, the sentence "Optimizing a model using a small training set may lead to skewed predictions." has two keywords that closely match the set of relevant keywords, "optimization" and "training set". The "optimization" keyword has a weight value of 1.0 and the "training set" keyword has a value 0.7. The content scoring service 330, may use the following scoring algorithm:

$$\text{Raw Score}_{Sentence} = \Sigma(KW_{weight}) * \text{Point}_{score\ factor}$$

where the $\text{Point}_{score\ factor}$ is set to 10. The content scoring service 330 for the example sentence may calculate the raw score as:

$$\text{Raw Score}_{Sentence} = \Sigma(\text{optimizing}(1.0)*10) + (\text{training set}(0.7)*10) = 17$$

In an embodiment, the raw score may be scaled to a relevance score scale based on a specified range such as 0-to-10. The raw score of 17, if it is the highest raw score, would be assigned a scaled relevance score of 10. In another embodiment, the relevance score may not need scaling and may simply by assigned the same value as the raw score.

At step 625, process 600 determines whether there are remaining sentences in the plurality of sentences. If there are remaining sentences that have not been assigned a relevance score, then process 600 proceeds back to step 605 to select the next sentence in the plurality of sentences. If, however, there are no remaining sentences to be assigned a relevance score, then process 600 ends.

Referring back to FIG. 5, at step 515 process 500 generates a set of relevant sentences from the plurality of sentences based upon the relevance score assigned to each sentence and a relevance threshold, where the relevance threshold represents a desired level of understanding of content from the meeting session. In an embodiment, the summary generation service 335 receives the plurality of sentences with their associated relevance scores and uses the relevance threshold to select relevant sentences based upon which sentences have a relevance score above the relevance threshold. The relevance threshold may be configured to a specific value based on the user's preferred level of understanding, a historical level of understanding for the overall meeting topic or based on historical user preferences of either the requesting user and/or other users that are similar to the requesting user. For example, if the requesting user requests that the meeting summary be based on a 70% level of understanding of the content, then the summary generation service 335 may set the relevance threshold value to reflect the 70% level of understanding. The summary generation service 335 may generate the set of relevant sentences that includes sentences that have a relevance score that is above the new relevance threshold value. Using the current example, if the relevance threshold is 70% or 7 out of 10, then the sentence "Optimizing a model using a small training set may lead to skewed predictions." which as a relevance score of 10, would be included in the set of relevant sentences.

At step 520, process 500 generates a meeting summary based on the set of relevant sentences. In an embodiment, the summary generation service 335 generates the meeting summary based on the content in the set of relevant sentences. The meeting summary may be a summarized block of text derived from the set of relevant sentences. In another example, the meeting summary may contain the summarized block of text as well as the set of relevant sentences. In yet another example, the meeting summary may also contain attached documents of the plurality of sentences spoken where the set of relevant sentences are highlighted or otherwise marked for identification as a relevant sentence.

At step 525, process 500 sends the meeting summary to a device associated with a user. In an embodiment, the conference management system 150 sends the meeting summary to the user device 120C, which is being used by the requesting user. User device 120C may receive the meeting summary and may cause the meeting summary to be displayed within web browser 344C. Alternatively, user device 120C may display the meeting summary within a client application 342C.

FIG. 7 depicts a flowchart for updating a relevance threshold used to generate a meeting summary, according to embodiments. Process 700 may be performed by a single program or multiple programs. The steps of the process as shown in FIG. 7 may be implemented using processor-executable instructions that are stored in computer memory. For the purposes of providing a clear example, the steps of FIG. 7 are described as being performed by computer programs representing the summary generation service 335. For the purposes of clarity process 700 is described in terms of a single entity.

In an embodiment, process 700 depicts steps for updating the relevance threshold to generate a new meeting summary based on a new level of understanding of the meeting content. The steps in FIG. 7 may be performed after the meeting summary is sent to a device associated with the user (step 525 in FIG. 5). Upon receiving the meeting summary, the user may modify the level of understanding associated with the meeting summary by sending a request to the conference management system 150. For example, if the user is using web browser 344C to view the meeting summary, web browser 344C may generate the request to modify the level of understanding associated with the meeting summary and send the request to the conference management system 150. Alternatively, if the user is using client application 342C, the client application 342C may generate and send the request to modify the level of understanding to the conference management system 150.

At step 710, process 700 receives a request to modify the level of understanding associated with the meeting summary. In an embodiment, the conference management system 150 may receive the request modify the level of understanding and send the request to the summary generation service 335. The request to modify the level of understanding may specify a specific value, such as 70% level of understanding, or may be a request to modify the level of understanding based on other factors. For instance, the request may instruct the summary generation service 335 to set the relevance threshold to a system default value, to the user's historical relevance threshold value, or to automatically select a relevance threshold value associated with other users or associated with the overall subject matter. A system default threshold value may represent a default threshold value initially set by the content management system 150. A historical relevance threshold value may represent a threshold value historically used by the user for previously generated meeting summaries. An automatically selected relevance threshold value may represent a threshold value based on other users that have similar skills and a similar background to the requesting user. Alternatively, the automatically selected relevance threshold value may represent a threshold value based on previously generated meeting summaries for meeting topics that are similar to the current meeting.

At step 715, process 700 updates the relevance threshold based on the request to modify the level of understanding. In an embodiment, the summary generation service 335 updates the relevance threshold value according to the received request. For example, if the request to modify the level of understanding specifies an 80% level of understanding, then the relevance threshold value is set to 80%.

At step 720, process 700 generates an updated set of relevant sentences from the plurality of sentences based upon the relevance score assigned to each sentence and an updated relevance threshold. In an embodiment, the summary generation service 335 uses the updated relevance threshold to select relevant sentences based upon which sentences have a relevance score above the updated relevance threshold. For example, if the updated relevance threshold value is set to 80%, which reflects an 80% level of understanding, then the summary generation service 335 may generate the set of relevant sentences that includes sentences that have a relevance score that is above the updated relevance threshold value of 80.

At step 725, process 700 generates a new meeting summary based on the set of relevant sentences and an updated relevance threshold. In an embodiment, the summary generation service 335 generates the new meeting summary based on the content in the set of relevant sentences. The new meeting summary may be a summarized block of text derived from the set of relevant sentences. In another example, the new meeting summary may contain the summarized block of text as well as the set of relevant sentences. In yet another example, the new meeting summary may also contain attached documents of the plurality of sentences spoken where the set of relevant sentences are highlighted or otherwise marked for identification as a relevant sentence.

At step 730, process 700 sends the new meeting summary to a device associated with a user. In an embodiment, the conference management system 150 sends the new meeting summary to the user device 120C, which is being used by the requesting user. User device 120C may receive the new meeting summary and may cause the new meeting summary to be displayed within web browser 344C. Alternatively, user device 120C may display the meeting summary within a client application 342C.

5.0 Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

5.1 Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

5.2 Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

5.3 Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

5.4 Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

5.5 Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

5.6 Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for generating a meeting summary, comprising:
   setting a relevance threshold, wherein the relevance threshold represents a level of understanding of content from the meeting session desired for a user with a known set of skills, and wherein setting the relevance threshold comprises:
      determining a baseline relevance threshold based on the known set of skills of the user and one or more historical relevance threshold values from other users having similar skills and similar backgrounds to the user;
      receiving user input specifying a desired level of detail for the meeting summary, and
      modifying the relevance threshold based on at least one of the baseline relevance thresholds and the desired level of detail;
   identifying a plurality of sentences spoken during a meeting session; assigning a relevance score to each sentence in the plurality of sentences, wherein the relevance score represents how important each sentence is to the meeting session;
   generating a set of relevant sentences from the plurality of sentences based upon the relevance score assigned to each sentence and the relevance threshold;
   generating the meeting summary based on the set of relevant sentences; and
   sending the meeting summary to a device associated with a user.

2. The computer-implemented method of claim 1, wherein the meeting session is one of a meeting occurring in real-time or a recorded meeting that has already taken place.

3. The computer-implemented method of claim 1, wherein the meeting session is a webinar.

4. The computer-implemented method of claim 1, wherein the meeting session is a meeting conference between a plurality of users.

5. The computer-implemented method of claim 1, further comprising:
   prior to identifying the plurality of sentences spoken during the meeting session, receiving content data representing content associated with the meeting session;
   wherein the content data comprises at least one of an audio recording of the meeting session, a video recording of the meeting session, and data files presented during the meeting session; and
   wherein identifying the plurality of sentences spoken during the meeting session are identified from the content data.

6. The computer-implemented method of claim 1, further comprising:
   receiving meeting data associated with the meeting session, wherein the meeting data contains information describing the meeting session; and
   determining a set of relevant keywords from the meeting data that represent relevant topics for the meeting session.

7. The computer-implemented method of claim 6, further comprising: assigning a weighted value to each relevant keyword in the set of relevant keywords based on historical relevance of each relevant keyword with respect to a meeting topic associated with the meeting session.

8. The computer-implemented method of claim 6, wherein assigning the relevance score to each sentence in the plurality of sentences, comprises:
   for each particular sentence in the plurality of sentences:
      identifying a plurality of keywords in the particular sentence;
      comparing the plurality of keywords to the set of relevant keywords; and
      assigning the relevance score to the particular sentence based on a number of matches between the plurality of keywords in the particular sentence, the set of relevant keywords, and weighted values associated with set of relevant keywords.

9. The computer-implemented method of claim 1, further comprising: prior to identifying the plurality of sentences, receiving a request for the meeting summary from a web-browser running on the device of the user.

10. The computer-implemented method of claim 1, further comprising: prior to identifying the plurality of sentences, receiving a request for the meeting summary from a standalone application running on the device of the user.

11. A non-transitory, computer-readable medium storing a set of instructions for generating a meeting summary, that, when executed by a processor, cause:
    setting a relevance threshold, wherein the relevance threshold represents a level of understanding of content from the meeting session desired for a user with a known set of skills, and wherein setting the relevance threshold comprises:
       determining a baseline relevance threshold based on the known set of skills of the user and one or more historical relevance threshold values from other users having similar skills and similar backgrounds to the user;
       receiving user input specifying a desired level of detail for the meeting summary; and modifying the relevance threshold based on at least one of the baseline relevance threshold and the desired level of detail;

identifying a plurality of sentences spoken during a meeting session;

assigning a relevance score to each sentence in the plurality of sentences, wherein the relevance score represents how important each sentence is to the meeting session;

generating a set of relevant sentences from the plurality of sentences based upon the relevance score assigned to each sentence and the relevance threshold;

generating the meeting summary based on the set of relevant sentences; and sending the meeting summary to a device associated with a user.

12. The non-transitory, computer-readable medium of claim 11, wherein the non-transitory, computer-readable medium storing further instructions that, when executed by the processor, cause:

prior to identifying the plurality of sentences spoken during the meeting session, receiving content data representing content associated with the meeting session;

wherein the content data comprises at least one of an audio recording of the meeting session, a video recording of the meeting session, and data files presented during the meeting session; and wherein identifying the plurality of sentences spoken during the meeting session are identified from the content data.

13. The non-transitory, computer-readable medium of claim 11, wherein the non-transitory, computer-readable medium storing further instructions that, when executed by the processor, cause:

receiving meeting data associated with the meeting session, wherein the meeting data contains information describing the meeting session;

determining a set of relevant keywords from the meeting data that represent relevant topics for the meeting session; and assigning a weighted value to each relevant keyword in the set of relevant keywords based on historical relevance of each relevant keyword with respect to a meeting topic associated with the meeting session.

14. The non-transitory, computer-readable medium of claim 11, wherein assigning the relevance score to each sentence in the plurality of sentences, comprises: for each particular sentence in the plurality of sentences:

identifying a plurality of keywords in the particular sentence;

comparing the plurality of keywords to the set of relevant keywords; and assigning the relevance score to the particular sentence based on a number of matches between the plurality of keywords in the particular sentence, the set of relevant keywords, and weighted values associated with set of relevant keywords.

15. A network-based system for generating a meeting summary, the system comprising:

a processor;

a memory operatively connected to the processor and storing instructions that, when executed by the processor, cause:

setting a relevance threshold, wherein the relevance threshold represents a level of understanding of content from the meeting session desired for a user with a known set of skills, and wherein setting the relevance threshold comprises:

determining a baseline relevance threshold based on the known set of skills of the user and one or more historical relevance threshold values from other users having similar skills and similar backgrounds to the user;

receiving user input specifying a desired level of detail for the meeting summary; and modifying the relevance threshold based on at least one of the baseline relevance thresholds and the desired level of detail;

identifying a plurality of sentences spoken during a meeting session;

assigning a relevance score to each sentence in the plurality of sentences, wherein the relevance score represents how important each sentence is to the meeting session;

generating a set of relevant sentences from the plurality of sentences based upon the relevance score assigned to each sentence and the relevance threshold;

generating the meeting summary based on the set of relevant sentences; and sending the meeting summary to a device associated with a user.

16. The system of claim 15, wherein the memory storing further instructions that, when executed by the processor, cause:

prior to identifying the plurality of sentences spoken during the meeting session, receiving content data representing content associated with the meeting session;

wherein the content data comprises at least one of an audio recording of the meeting session, a video recording of the meeting session, and data files presented during the meeting session; and wherein identifying the plurality of sentences spoken during the meeting session are identified from the content data.

17. The system of claim 15, wherein the memory storing further instructions that, when executed by the processor, cause:

receiving meeting data associated with the meeting session, wherein the meeting data contains information describing the meeting session;

determining a set of relevant keywords from the meeting data that represent relevant topics for the meeting session; and assigning a weighted value to each relevant keyword in the set of relevant keywords based on historical relevance of each relevant keyword with respect to a meeting topic associated with the meeting session.

18. The system of claim 15, wherein assigning the relevance score to each sentence in the plurality of sentences, comprises: for each particular sentence in the plurality of sentences:

identifying a plurality of keywords in the particular sentence;

comparing the plurality of keywords to the set of relevant keywords; and assigning the relevance score to the particular sentence based on a number of matches between the plurality of keywords in the particular sentence, the set of relevant keywords, and weighted values associated with set of relevant keywords.

* * * * *